(12) United States Patent
Izumi et al.

(10) Patent No.: US 7,151,355 B2
(45) Date of Patent: Dec. 19, 2006

(54) ELECTRIC MOTOR DRIVING SYSTEM, ELECTRIC FOUR-WHEEL DRIVE VEHICLE, AND HYBRID VEHICLE

(75) Inventors: Shiho Izumi, Hitachi (JP); Satoru Kaneko, Naka (JP); Tatsuyuki Yamamoto, Mito (JP); Kenta Katsuhama, Hitachinaka (JP); Kazuya Motegi, Ohta (JP); Hideki Miyazaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/349,267

(22) Filed: Feb. 8, 2006

(65) Prior Publication Data

US 2006/0220608 A1 Oct. 5, 2006

(30) Foreign Application Priority Data

Mar. 31, 2005 (JP) .............................. 2005-101425

(51) Int. Cl.
*H02P 27/04* (2006.01)
(52) U.S. Cl. ...................... 318/801; 318/800; 318/140; 318/146; 180/65.1; 180/65.2; 180/65.3
(58) Field of Classification Search ................ 318/801, 318/800, 140, 146; 180/65.1, 65.2, 65.3
See application file for complete search history.

(56) References Cited

U.S. PATENT DOCUMENTS 5,586,613 A * 12/1996 Ehsani ...................... 180/65.2
5,791,426 A * 8/1998 Yamada et al. ............. 180/65.2
5,873,801 A * 2/1999 Taga et al. ...................... 477/5
5,905,346 A * 5/1999 Yamada et al. ............... 318/50
5,973,460 A * 10/1999 Taga et al. ................... 318/139
6,554,088 B1 * 4/2003 Severinsky et al. ........ 180/65.2
6,953,415 B1 * 10/2005 Kadota ........................... 477/5

FOREIGN PATENT DOCUMENTS

| JP | 357078382 | * | 5/1982 |
| JP | A11-332007 | | 11/1988 |
| JP | A2003-134602 | | 5/2003 |
| JP | 02004222395 | * | 8/2004 |

* cited by examiner

*Primary Examiner*—Rita Leykin
(74) *Attorney, Agent, or Firm*—Crowell & Moring LLP

(57) ABSTRACT

An electric four-wheel drive vehicle includes: an internal combustion engine; a generator for outputting DC electrical power; an inverter for converting DC electrical power, output from the generator, into AC electrical power; and an AC electric motor, which is driven by the inverter, for driving rear wheels. An electric motor controller controls the inverter, the AC electric motor, and the generator, according to torque instructions from a vehicle. Furthermore, in a case that the output of the AC electric motor becomes negative, and excess electrical energy is generated, the electric motor controller controls the current applied to said AC electric motor such that the loss in said AC electric motor exceeds the negative output of said AC electric motor. This enables the AC electric motor to absorb excess electrical energy in the form of thermal loss.

20 Claims, 12 Drawing Sheets

ELECTRIC MOTOR DRIVING SYSTEM, ELECTRIC FOUR-WHEEL DRIVE VEHICLE, AND HYBRID VEHICLE

BACKGROUND OF THE INVENTION

1. Field of the Invention

The present invention relates to an electric motor drive system, an electric four-wheel drive vehicle, and a hybrid vehicle, and particularly to an electric motor control system for controlling a generator and electric motor, and an electric four-wheel drive vehicle and hybrid vehicle including such an electric motor control system.

2. Description of the Related Art

As a control device for a hybrid vehicle, a series hybrid vehicle is known as disclosed in JP-A-11-332007, for example. The aforementioned series hybrid vehicle has a configuration in which an output shaft of an engine is mechanically separated from a vehicle driving shaft. With such a configuration, the electrical energy generated by a generator driven by the engine is supplied to a driving electric motor, and the vehicle is driven using the output torque.

Also, a hybrid vehicle is known, which has a battery for temporarily storing generated electrical power and regenerative electrical power, as disclosed in JP-A-11-332007. With such an arrangement, at the time of controlling the vehicle speed or braking the vehicle, the driving generator is used as a regenerative brake, and the regenerative energy generated in this stage is stored in the battery, thereby enabling the energy generated in the reduction of the vehicle speed to be effectively used. On the other hand, it is known that in a case where the battery for absorbing the regenerative energy is almost fully charged, the regenerative electrical power continuously generated by the driving generator leads to overcharge of the battery. In order to prevent such a situation, a technique is known that in a case of the battery being almost fully charged, the generator is operated in the power-running state with the rotational resistance of the engine as a load so as to consume the regenerative current.

Also, another control method is known for consuming excess regenerative energy, which can be applied irrespective of whether or not the engine is connected to the generator, as disclosed in JP-A-2003-134602. Specifically, JP-A-2003-134602 discloses a hybrid vehicle having a configuration in which in a case that the battery cannot absorb the regenerative energy, the generator is controlled so as to operate with loss of energy, thereby consuming the excess regenerative energy.

SUMMARY OF THE INVENTION

The aforementioned JP-A-11-332007 and JP-A-2003-134602 disclose techniques in which the regenerative energy generated by the driving electric motor in the regeneration operation is stored in the battery, and the generator is controlled so as to consume any excess regenerative energy. However, such a technique, in which the excess energy is consumed by the generator, disclosed in JP-A-11-332007 and JP-A-2003-134602 cannot be applied to a hybrid vehicle employing an AC generator as the generator. Furthermore, an electric four-wheel drive vehicle having no battery cannot perform regeneration operation.

It is an object of the present invention to provide: an electric motor control system which has a function of consuming the excess regenerative energy, and which can be applied to an electric four-wheel drive vehicle having no battery and a hybrid vehicle employing an AC generator as a generator; an electric four-wheel drive vehicle and hybrid vehicle including such an electric motor control system.

(1) In order to solve the aforementioned problems, according to a first aspect of the present invention, a control system for an electric driving system is included in an electric driving system for a vehicle. With such an arrangement, the electric driving system for a vehicle includes: an in-vehicle power supply for supplying DC electrical power; an inverter for converting the DC electrical power output from the in-vehicle power supply, into AC electrical power; and an AC electric motor, which is driven by the AC electrical power output from the inverter, for generating electrical driving force for driving a component to be driven. Furthermore, the control system for an electric driving system includes control means for controlling driving of the AC electric motor by controlling the inverter according to an instructed torque for the AC electric motor. In a case that the output of the AC electric motor becomes negative, and excess electrical energy is generated, the control means control the current applied to the AC electric motor such that the loss in the AC electric motor exceeds the negative output of the AC electric motor.

Such an arrangement allows an electric four-wheel drive vehicle having no battery to consume excess regenerative energy.

(2) With the control system for an electric driving system according to the aforementioned (1), in a case that the output of the AC electric motor becomes negative, and excess electrical energy is generated, the control means preferably control the current applied to the AC electric motor so as to increase ineffective current in the AC electric motor.

(3) With the control system for an electric driving system according to the aforementioned (2), the ineffective current in the AC electric motor, which is absorbed in the form of loss in the AC electric motor, is preferably determined based upon the excess electrical power output to the inverter from the in-vehicle power supply.

(4) In order to solve the aforementioned problems, according to a second aspect of the present invention, a control system for an electric driving system, is included in an electric driving system for a multi-wheel drive vehicle. With such an arrangement the electric driving system for a multi-wheel drive vehicle includes: a generator for outputting DC electrical power by the driving force received from an internal combustion engine for driving at least one of multiple wheels; an inverter for converting the DC electrical power directly received from the generator, into AC electrical power; and an AC electric motor, which is driven by the AC electrical power output from the inverter, for driving at least one of the multiple wheels other than the wheels driven by the internal combustion engine. Furthermore, the control system for an electric driving system includes control means for controlling driving of the AC electric motor by controlling the inverter according to an instructed torque received from a vehicle for the AC electric motor. In a case that the output of the AC electric motor becomes negative, and excess electrical energy is generated, the control means control the current applied to the AC electric motor such that the loss in the AC electric motor exceeds the negative output of the AC electric motor.

Such an arrangement allows an electric four-wheel drive vehicle having no battery to consume excess regenerative energy.

(5) With the control system for an electric driving system according to the aforementioned (4), in a case that the output of the AC electric motor becomes negative, and excess electrical energy is generated, the control means preferably control the current applied to the AC electric motor so as to increase ineffective current in the AC electric motor.

(6) With the control system for an electric driving system according to the aforementioned (5), the ineffective current in the AC electric motor, which is absorbed in the form of loss in the AC electric motor, is preferably determined based upon the excess electrical power output to the inverter from the generator.

(7) In order to solve the aforementioned problems, according to a third aspect of the present invention, a control system for an electric driving system is included in an electric driving system for an electric vehicle. With such an arrangement, the electric driving system for an electric vehicle includes: a capacitor which enables charging/discharging using DC electrical power; an inverter for converting the DC electrical power received by discharging the capacitor, into AC electrical power; and an AC electric motor, which is driven by the AC electrical power output from the inverter, for generating electrical driving force for driving the vehicle. Furthermore, the control system for an electric driving system includes control means for controlling driving of the AC electric motor by controlling the inverter according to an instructed torque received from a vehicle for the AC electric motor. In a case that the output of the AC electric motor becomes negative, and excess electrical energy is generated, the control means control the current applied to the AC electric motor such that the loss in the AC electric motor exceeds the negative output of the AC electric motor.

Such an arrangement allows an electric four-wheel drive vehicle having no battery to consume excess regenerative energy.

(8) With the control system for an electric driving system according to the aforementioned (7), in a case that the output of the AC electric motor becomes negative, and excess electrical energy is generated, the control means preferably control the current applied to the AC electric motor so as to increase ineffective current in the AC electric motor.

(9) With the control system for an electric driving system according to the aforementioned (8), the ineffective current in the AC electric motor, which is absorbed in the form of loss in the AC electric motor, is preferably determined based upon the excess electrical power output to the inverter from the capacitor.

(10) In order to solve the aforementioned problems, according to a fourth aspect of the present invention, an electric driving system for a vehicle, for generating electrical driving force for driving a component of the vehicle to be driven, comprises: an in-vehicle power supply for supplying DC electrical power; an inverter for converting the DC electrical power, output from the in-vehicle power supply, into AC electrical power; an AC electric motor, which is driven by the AC electrical power output from the inverter, for generating electrical driving force; and a control unit for controlling driving of the AC electric motor by controlling the inverter according to an instructed torque for the AC electric motor. With such an arrangement, in a case that the output of the AC electric motor becomes negative, and excess electrical energy is generated, the control unit controls the current applied to the AC electric motor such that the loss in the AC electric motor exceeds the negative output of the AC electric motor. In this case, the excess electrical power is supplied to the inverter from the in-vehicle power supply in the form of loss in the AC electric motor.

Such an arrangement allows an electric four-wheel drive vehicle having no battery to consume excess regenerative energy.

(11) With the electric driving system for a vehicle according to the aforementioned (10), in a case that the output of the AC electric motor becomes negative, and excess electrical energy is generated, the control means preferably control the current applied to the AC electric motor so as to increase ineffective current in the AC electric motor.

(12) With the electric driving system for a vehicle according to the aforementioned (11), the ineffective current in the AC electric motor is preferably determined based upon the excess electrical power.

(13) In order to solve the aforementioned problems, according to a fifth aspect of the present invention, an electric driving system for a multi-wheel drive vehicle having a function of driving at least one of multiple wheels by an internal combustion engine, and a function of driving at least one of the multiple wheels other than the wheels driven by the internal combustion engine, by electrical driving force, comprises: a generator for outputting DC electrical power by the driving force received from the internal combustion engine; an inverter for converting the DC electrical power directly received from the generator, into AC electrical power; an AC electric motor, which is driven by the AC electrical power output from the inverter, for driving at least one of the multiple wheels other than the wheels driven by the internal combustion engine; and a control device including control means for controlling driving of the AC electric motor by controlling the inverter according to an instructed torque received from a vehicle for the AC electric motor. With such an arrangement, in a case that the output of the AC electric motor becomes negative, and excess electrical energy is generated, the control means control the current applied to the AC electric motor such that the loss in the AC electric motor exceeds the negative output of the AC electric motor. In this case, the excess electrical power is supplied to the inverter from the generator in the form of loss in the AC electric motor.

Such an arrangement allows an electric four-wheel drive vehicle having no battery to consume excess regenerative energy.

(14) With the electric driving system according to the aforementioned (13), in a case that the output of the AC electric motor becomes negative, and excess electrical energy is generated, the control means preferably control the current applied to the AC electric motor so as to increase ineffective current in the AC electric motor.

(15) With the electric driving system according to the aforementioned (14), the ineffective current in the AC electric motor is preferably determined based upon the excess electrical power.

(16) In order to solve the aforementioned problems, according to a sixth aspect of the present invention, an electric driving system for driving a vehicle by electrical driving force comprises: a capacitor which enables charging/discharging using DC electrical power; an inverter for converting the DC electrical power received by discharging the capacitor, into AC electrical power; an AC electric motor, which is driven by the AC electrical power output from the inverter, for generating the electrical driving force; and a control device including control means for controlling driving of the AC electric motor by controlling the inverter according to an instructed torque received from a vehicle for the AC electric motor. With such an arrangement, in a case that the output of the AC electric motor becomes negative, and excess electrical energy is generated, the control means control the current applied to the AC electric motor such that the loss in the AC electric motor exceeds the negative output of the AC electric motor. In this case, the excess electrical power is supplied to the inverter from the capacitor in the form of loss in the AC electric motor.

Such an arrangement allows an electric four-wheel drive vehicle having no battery to consume excess regenerative energy.

(17) With the electric driving system according to the aforementioned (16), in a case that the output of the AC electric motor becomes negative, and excess electrical energy is generated, the control means preferably control the current applied to the AC electric motor so as to increase ineffective current in the AC electric motor.

(18) With the electric driving system according to the aforementioned (17), the ineffective current in the AC electric motor is preferably determined based upon the excess electrical power.

(19) In order to solve the aforementioned problems, according to a seventh aspect of the present invention, a multi-wheel drive vehicle comprises: an internal combustion engine for driving at least one of multiple wheels; a generator, which is driven by the internal combustion engine, for outputting DC electrical power; an inverter for converting the DC electrical power, directly received from the generator, into AC electrical power; an AC electric motor, which is driven by the AC electrical power output from the inverter, for driving at least one of the multiple wheels other than the wheels driven by the internal combustion engine; and a control device including control means for controlling driving of the AC electric motor by controlling the inverter according to an instructed torque received from a vehicle for the AC electric motor. With such an arrangement, in a case that the output of the AC electric motor becomes negative, and excess electrical energy is generated, the control means control the current applied to the AC electric motor such that the loss in the AC electric motor exceeds the negative output of the AC electric motor. In this case, the excess electrical power is supplied to the inverter from the generator in the form of loss in the AC electric motor.

Such an arrangement allows an electric four-wheel drive vehicle having no battery to consume excess regenerative energy.

(20) In order to solve the aforementioned problems, according to a seventh aspect of the present invention, a hybrid vehicle comprises: an internal combustion engine for generating driving force for a vehicle; an AC electric motor for generating driving force for the vehicle; a capacitor forming a power supply for the AC electric motor; an inverter for converting DC electrical power received from the capacitor, into AC electrical power, which is supplied to the AC electric motor for driving the AC electric motor; and a control device including control means for controlling driving of the AC electric motor by controlling the inverter according to an instructed torque received from a vehicle for the AC electric motor. With such an arrangement, in a case that the output of the AC electric motor becomes negative, and excess electrical energy is generated, the control means control the current applied to the AC electric motor such that the loss in the AC electric motor exceeds the negative output of the AC electric motor. In this case, the excess electrical power is supplied to the inverter from the capacitor in the form of loss in the AC electric motor.

Such an arrangement allows an electric four-wheel drive vehicle having no battery to consume excess regenerative energy.

The present invention provide a technique which enables excess regenerative energy to be consumed in an electric four-wheel drive vehicle having no battery to consume, and a hybrid vehicle having a configuration employing an AC generator as a generator motor.

DESCRIPTION OF THE PREFERRED EMBODIMENTS

Description will be made below regarding a configuration and operation of an electric motor control system and an electric four-wheel drive vehicle including such an electric motor control system according to an embodiment of the present invention with reference to FIGS. 1 through 10.

First, description will be made regarding a configuration and operation of an arrangement in which an electric motor control system according to the present embodiment is applied to an electric four-wheel drive vehicle employing an AC electric motor, with reference to FIG. 1.

Figure 1:
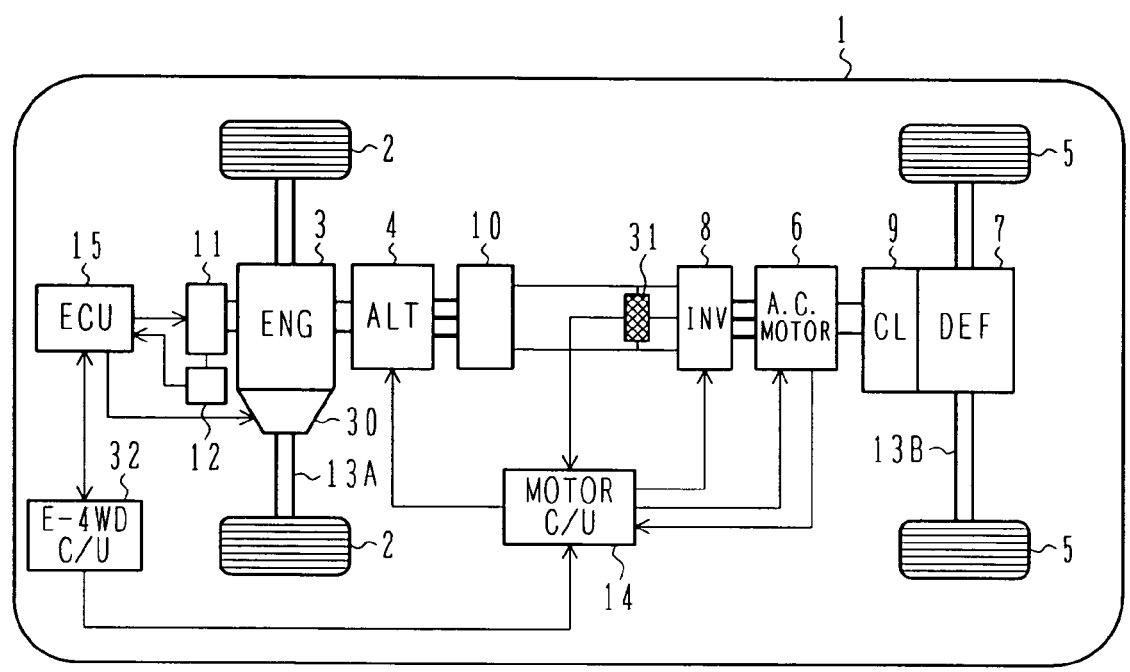
FIG. 1 is a system block diagram which shows an overall configuration in which an electric motor control system according to an embodiment of the present invention is applied to an electric four-wheel drive vehicle employing an AC electric motor.

FIG. 1 is a system block diagram which shows an overall configuration in which an electric motor control system according to an embodiment of the present invention is applied to an electric four-wheel drive vehicle employing an AC electric motor.

An electric four-wheel drive vehicle 1 includes an engine 3 and an AC electric motor 6. The driving force of the engine 3 is transmitted to front wheels 2 through a transmission 30 and axle shafts 13A, thereby driving the front wheels 2. The output of the engine 3 is controlled by an electronic control throttle 11 which is driven according to instructions from an engine control unit (ECU) 15. The electronic control throttle 11 includes a throttle opening sensor 12 for detecting the throttle opening of the electronic control throttle 11. The throttle opening thus detected is acquired by the ECU 15. Furthermore, the ECU 15 controls the transmission 30.

The driving force of the AC electric motor 6 is transmitted to rear wheels 5 through a clutch 9, a differential gear 7, and axle shafts 13B, thereby driving the rear wheels 5. Specifically, upon the differential gear 7 engaging with the clutch 9, the rotational force of the AC electric motor 6 is distributed to the left and right axle shafts 13B by the differential gear 7, thereby driving the rear wheels 5. Upon the release of the clutch 9, the AC electric motor 6 is mechanically separated from the rear wheels 5. In this state, the driving force is not transmitted to the rear wheels 5.

FIG. 1 shows an arrangement in which the AC electric motor 6 is engaged with the wheels through a switching mechanism such as the clutch 9 and so forth. Also, an arrangement may be made in which the AC electric motor 6 is directly connected to the wheels. Note that the electric four-wheel drive vehicle requires the AC motor 6 to perform over a wide operational range (rotational range) from a low speed up to a high speed. For example, let us consider a situation in which the vehicle is driven so as to escape from deep snow or mud. In this case, the important performance is that the vehicle can be driven using the rear wheel torque alone. Furthermore, there is a need to output a large amount of torque at a low speed. On the other hand, let us consider a case in which the vehicle is driven in the four-wheel drive mode over a range of speeds up to a medium-level speed. In this case, there is a need to drive the electric motor at an extremely high rotational speed. Accordingly, examples of motor types which can be effectively employed as the AC motor 6 include a permanent magnet synchronous motor and a field-coil synchronous motor, which are generally employed for driving a hybrid vehicle. The field-coil synchronous motor has a function of reducing the field current in a high-rotational range so as to reduce the magnetic flux. This suppresses the induced voltage, thereby enabling the electric motor to be driven up to a high-rotational range.

Furthermore, an inverter 8 is provided for discretionary control of the required driving force of the AC motor 6. Specifically, the inverter 8 converts the DC electrical power output from the generator 4 into AC electrical power, and supplies the AC electrical power thus generated, to the AC electric motor 6. Here, the electrical power is input to the inverter 8 in an extremely pulsed manner due to switching of power devices. Accordingly, a capacitor 31 is provided to the inverter 8 for smoothing such a pulsed electrical power. Note that the inverter 8 includes the capacitor 31 therewithin.

The engine 3 is connected to a dedicated generator 4. The AC electrical power generated by the generator 4 is converted into DC electrical power with a diode bridge 10. The inverter 8 converts the DC electrical power into AC electrical power, whereby the AC electric motor 6 generates driving force. With such an arrangement, the voltage required by the AC electric motor 6 to generate the required torque is obtained by controlling the generator 4. Thus, the AC electric motor 6 is driven by the output of the generator 4. Here, the generator 4 employed in the present embodiment is an AC generator such as an alternator or the like. The generator 4 has a configuration which enables power generation control by adjustment of the field current applied to the field coil. In general, a combination of the generator 4 having such a configuration and the diode bridge 10 is referred to as "alternator".

A four-wheel drive controller 32 is connected to other devices through the communication means such as the ECU 15 and CAN, or the like. The four-wheel drive controller 32 serves as a four-wheel drive system for performing control processing such as calculation of the torque instruction transmitted to the AC electric motor 6 for the rear wheels based upon the vehicle information, and so forth. An electric motor controller 14 controls the generator 4, inverter 8, and AC electric motor 6, based upon the engine revolution, torque instruction, voltage applied to the capacitor 31, the revolution of the AC electric motor 6, and the magnetic pole position, which are obtained from the four-wheel drive controller 32.

Next, description will be made regarding the configuration and operation of the electric motor controller 14 which is an electric motor control system according to an embodiment of the present invention with reference to FIG. 2.

Figure 2:
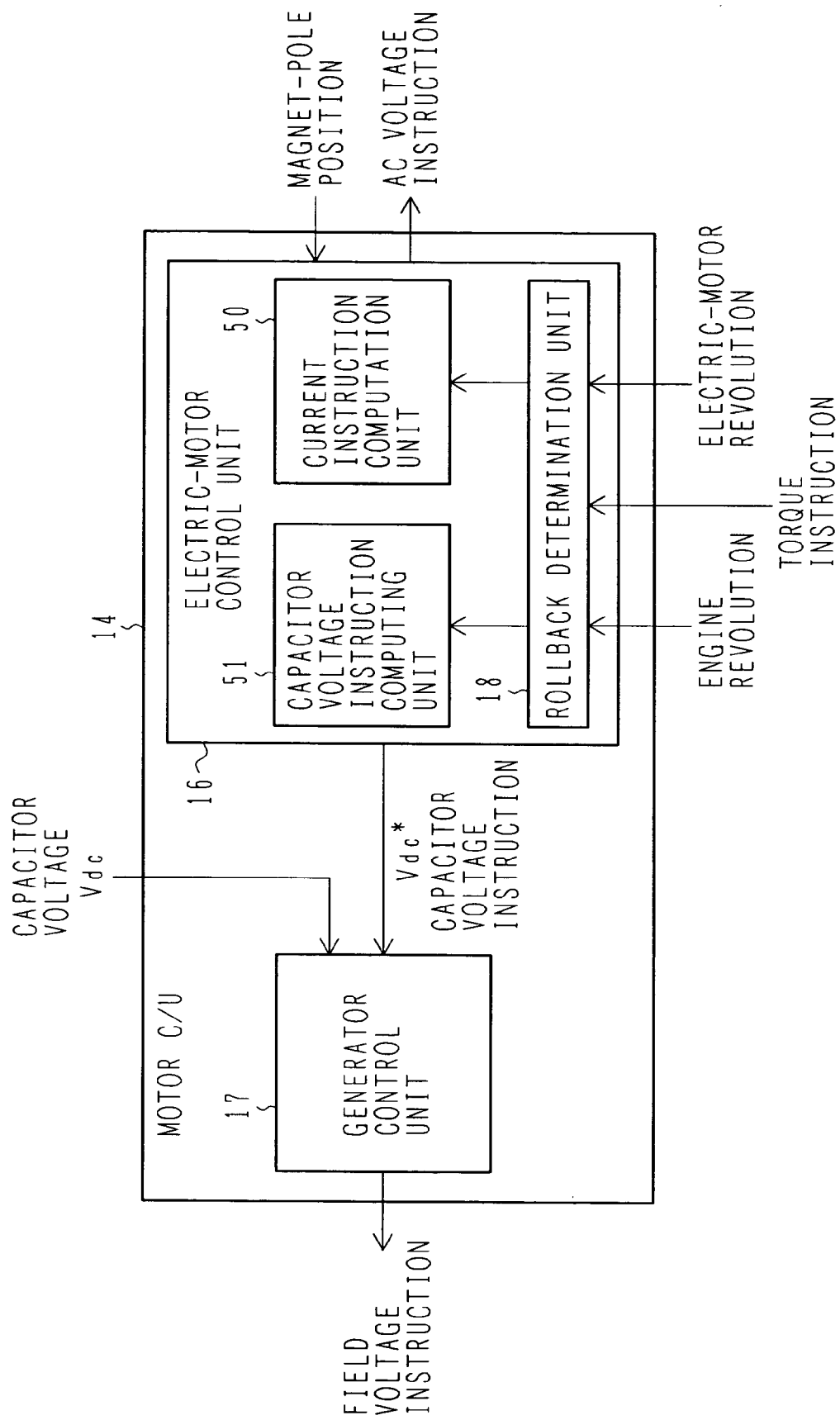
FIG. 2 is a block diagram which shows a configuration of an electric motor controller which is an electric motor control system according to an embodiment of the present invention.

FIG. 2 is a block diagram which shows the configuration of an electric motor controller which is an electric motor control system according to an embodiment of the present invention.

As shown in FIG. 2, the electric motor controller ECU 14 comprises an electric motor control unit 16 for controlling the AC electric motor 6 and the inverter 8, and a generator control unit 17 for controlling the generator 4. The electric motor control unit 16 controls the AC electric motor 6 according to the torque instruction received from the four-wheel drive controller 32, which serves as an upper control unit. The electric motor control unit 16 includes a rollback determination unit 18, a current instruction computation unit 50, and a capacitor voltage instruction computation unit 51. The generator control unit 17 performs power generation control of the generator 4 for generating electrical power to be input to the inverter 8 and the AC electric motor 6. Specifically, the generator control unit 17 serves as a capacitor voltage control unit and a voltage feedback control unit for performing feedback control of the field voltage instruction C1 (Vgf*) for the field coil of the generator 4 such that the capacitance voltage Vdc between both terminals of the capacitor 31 matches the capacitor voltage instruction value Vdc* output from the electric motor control unit 16. Detailed description will be made regarding the configuration and operation of the electric motor control unit 16 and the generator control unit 17 with reference to FIGS. 3 through 9.

The electric four-wheel drive vehicle having such a configuration shown in FIG. 2 has no battery for absorbing electrical power. Accordingly, the operation control needs to be performed such that the electrical power generated by the generator, which receives the rotational driving power received from the engine, matches the driving energy input to the inverter and the electric motor. Let us consider a case in which the operation control fails to maintain the balance between the generated energy and the driving energy. First, let us consider a case in which the generated energy is greater than the driving energy. In this case, the excess electrical power flows into the smoothing capacitor 31, leading to an increase of the voltage of the DC bus. In some cases, the excess voltage of the DC bus exceeds the permissible value, which results in damage to the power devices included in the capacitor 31 and the inverter 8. Conversely, let us consider a case in which the generated energy is smaller than the driving energy. In this case, the insufficient electrical power stored in the capacitor 31 is exhausted by the inverter and the electric motor, leading to reduction in the voltage thereof. This leads to a problem situation in which the required torque cannot be output. Accordingly, in a system which does not have a battery, it is important to control the generated energy and the driving energy with a proper balance therebetween. Furthermore, the same can be said of a hybrid vehicle having a battery in a case of the battery being almost fully charged, or the like, as well as the electric four-wheel drive vehicle having no battery. In such cases, there is a need to control the system so as to suppress the regenerative electrical power.

Description will be made below regarding the control processing for handling the rollback state of the electric four-wheel drive vehicle in which the vehicle moves in the direction opposite to the intended direction of the travel (which will be referred to as "driving direction" hereafter).

Description will be made regarding the configuration and operation of the electric motor control unit 16 included in the electric motor control system according to the present embodiment with reference to FIG. 3.

Figure 3:
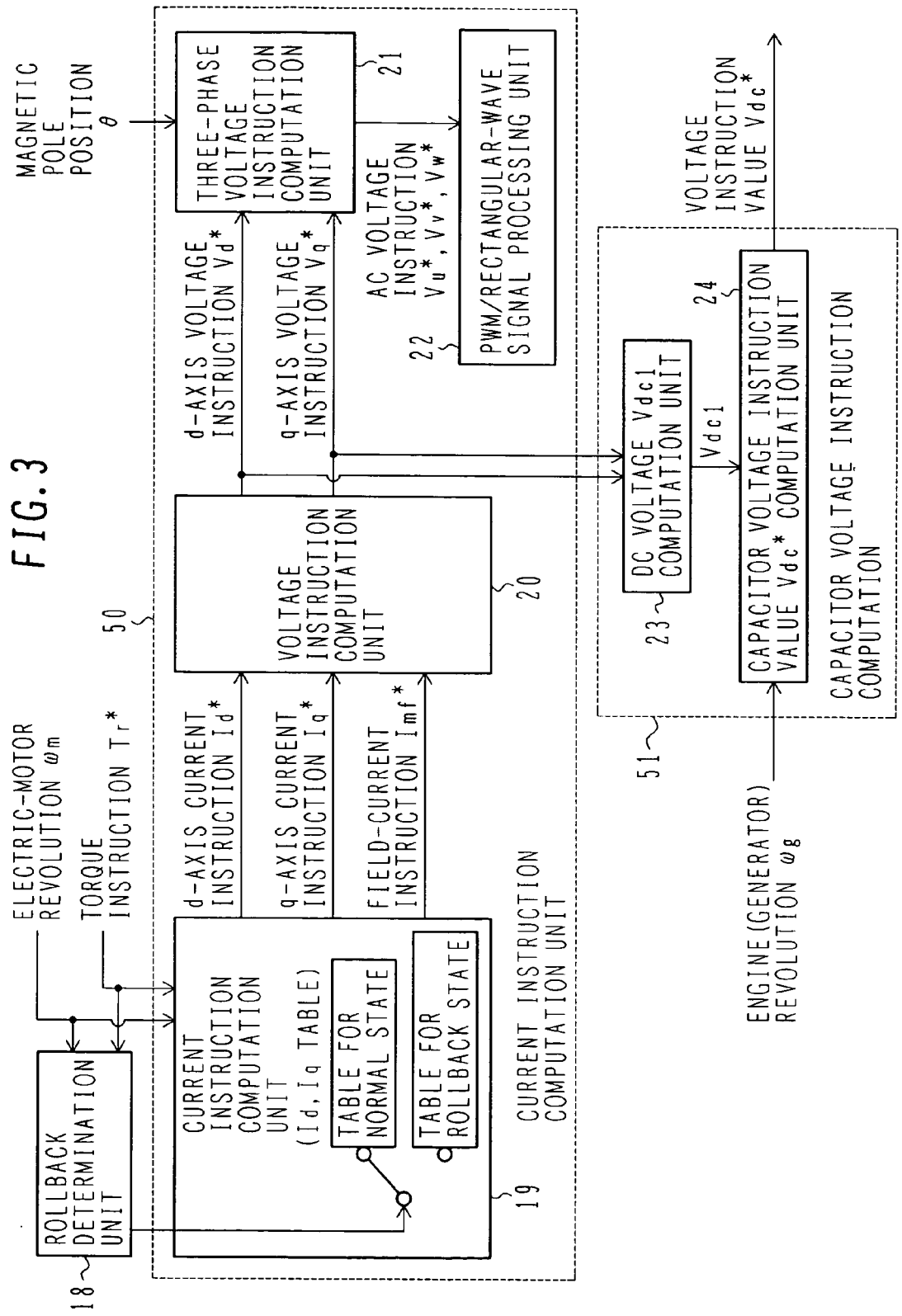
FIG. 3 is a block diagram which shows a configuration of an electric motor control unit included in an electric motor control system according to an embodiment of the present invention.

FIG. 3 is a block diagram which shows the configuration of the electric motor control unit included in the electric motor control system according to an embodiment of the present invention.

As shown in FIG. 2, the electric motor control unit 16 comprises the rollback determination unit 18, the current instruction computation unit 50 for calculating the instruction values for controlling the AC motor 6 and the inverter 8, and the capacitor voltage instruction computation unit 51 for calculating the instruction value for controlling the capacitor voltage.

The rollback determination unit 18 determines the state of the vehicle based upon the electric motor revolution ωm and the torque instruction Tr*. In a case that the torque instruction Tr* is a positive value, and the electric-motor rotational speed ωm is a negative value, or in a case that the torque instruction Tr* is a negative value, and the electric-motor rotational speed ωm is a positive value, determination is made that the electric motor is rotating in the direction opposite to the driving direction. That is to say, in such a case, determination is made that the vehicle is in the rollback state.

The current instruction computation unit 50 includes a current instruction computation unit 19, a voltage instruction computation unit 20, and a three phase voltage instruction computation unit 21, and a PWM/rectangular-wave-signal processing unit 22. The current instruction computation unit 19 calculates the d-axis current instruction Id*, q-axis current instruction Iq*, and field-coil current instruction Imf*, for the synchronous electric motor, based upon the torque instruction Tr* and electric motor revolution ωm. For example, the current instruction computation unit 50 stores the data of the d-axis current Id and the data of the q-axis current Iq therewithin for each operating point for both the normal state and the rollback state in the form of a table. With such an arrangement, the current instruction computation unit 50 determines the Id* instruction value and the Iq* instruction value for each operating point based upon the tables thus stored. Switching between the normal state and the rollback state is performed based upon the determination result made by the rollback determination unit 18.

Now, description will be made regarding the control operation of the electric motor control unit 16 included in the electric motor control system according to the present embodiment with reference to FIG. 4.

Figure 4:
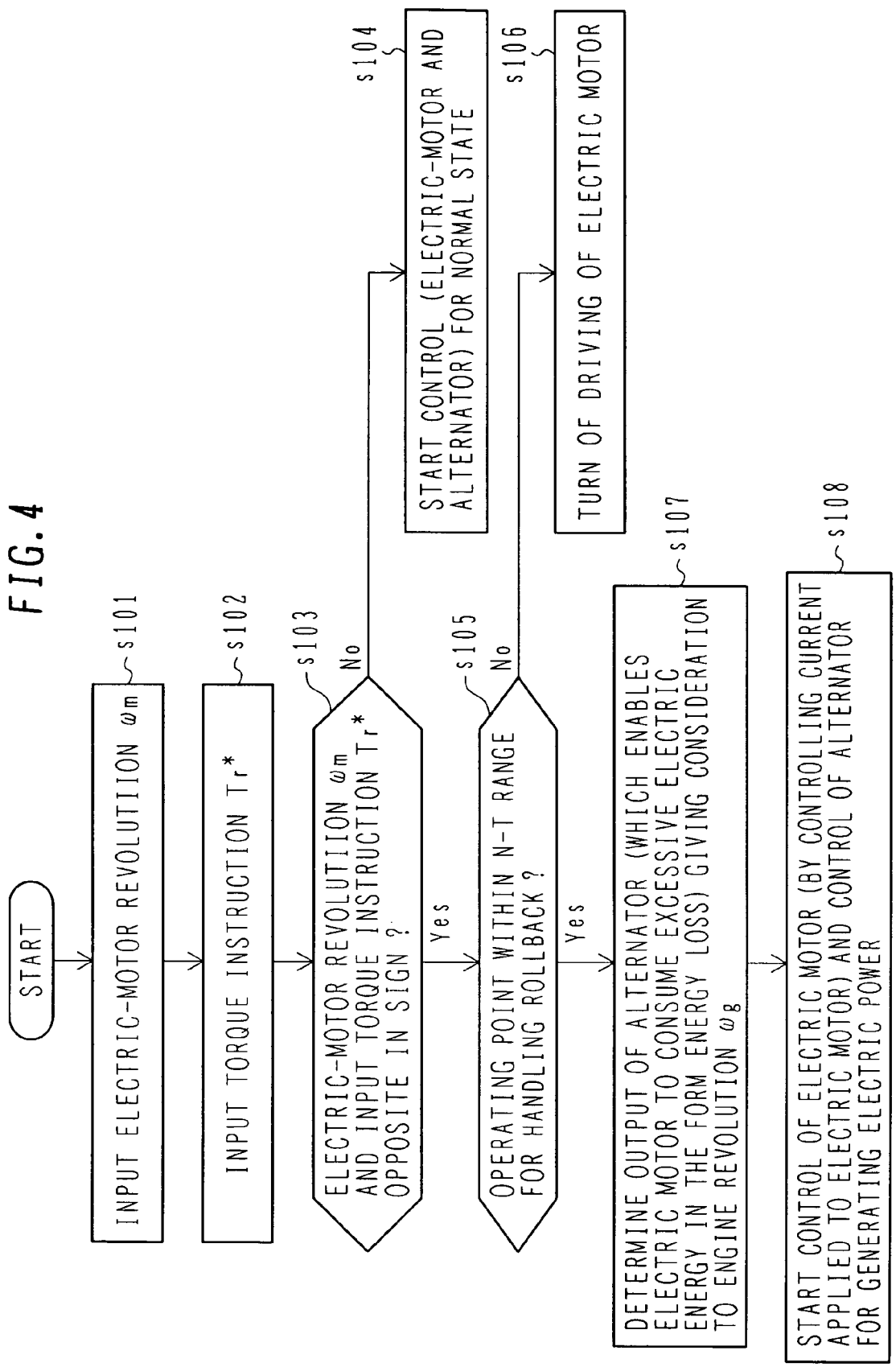
FIG. 4 is a flowchart which shows the operation of an electric motor control unit included in an electric motor control system according to an embodiment of the present invention.

FIG. 4 is a flowchart which shows the operation of the electric motor control unit included in the electric motor control system according to an embodiment of the present invention.

First, in Step s101, the electric motor control unit 16 receives the electric motor revolution ωm as an input signal. Furthermore, in Step s102, the electric motor control unit 16 receives the torque instruction Tr* as an input signal.

Next, in Step s103, the rollback determination unit 18 determines the state of the vehicle based upon the electric motor revolution ωm and the torque instruction Tr*. Specifically, in a case that the signs of the torque instruction Tr* and the electric motor revolution ωm are opposite, the rollback determination unit 18 makes a determination of the rollback state.

In Step s103, in a case that determination has been made that the vehicle is not in the roll back state, the flow proceeds to Step s104. In Step s104, the current instruction computation unit 19 calculates the current instruction values (Id*, Iq*, Imf*) for controlling the electric motor and alternator in the normal state, and the flow proceeds to the Step for the processing performed by the voltage instruction computation unit 20.

On the other hand, in Step s103, in a case that determination has been made that the vehicle is in the roll back state, the flow proceeds to Step s105. The output of the electric motor in the rollback state is minus, and the electric motor generates regenerative electrical power. Accordingly, in a case that determination has been made that the vehicle is in the rollback state, there is a need to control the system in different manner from that employed in the normal mode, so as to absorb the regenerative energy. First, in Step s105, the current instruction computation unit 19 determines whether or not the control operation can be applied based upon the rollback N-T characteristic.

Now, description will be made regarding the rollback N-T characteristic used by the electric motor control system according to the present embodiment with reference to FIG. 5.

Figure 5:
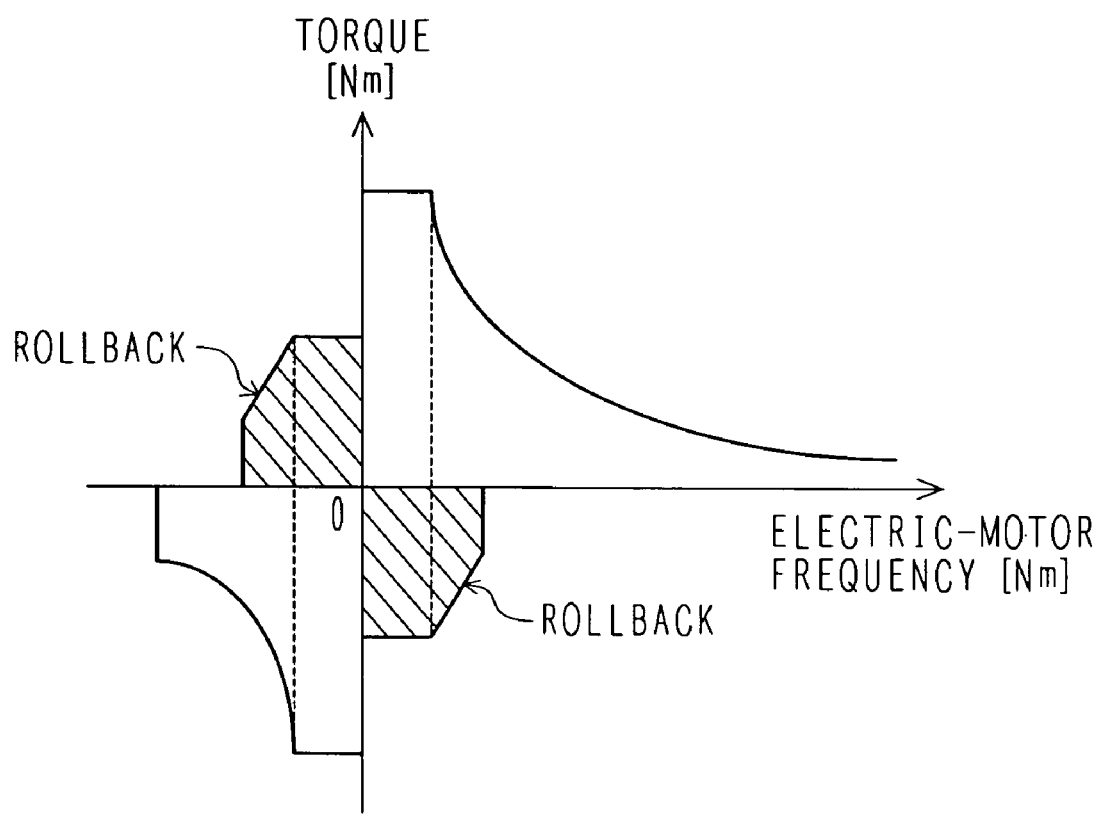
FIG. 5 is an explanatory diagram for describing the rollback N-T characteristic used by an electric motor control system according to an embodiment of the present invention.

FIG. 5 is an explanatory diagram for describing the rollback N-T characteristic used by the electric motor control system according to an embodiment of the present invention.

FIG. 5 shows an example of the characteristic of the torque (Nm) with respect to the electric-motor frequency (Hz). In FIG. 5, the hatched regions represent the regions where the control operation can be applied based upon the rollback N-T characteristic, i.e., the rollback operation region. With an arrangement employing an electric motor having the electric motor characteristic as shown in FIG. 5, in a case that the operating point, i.e., the combination of the torque instruction Tr* and the electric-motor rotational speed ωm (electric-motor frequency) does not fall within the rollback operation region, the flow proceeds to Step s106, whereupon the four-wheel drive controller 32 stops the four-wheel drive mode.

In Step s105, in a case that determination has been made that the operating point is within the region where the control operation based upon the rollback N-T characteristic can be applied, the flow proceeds to Step s107. In Step s107, the output of the generator 4 (which enables the electric motor to consume excess electrical power in the form of electric motor loss) is determined giving consideration to the engine revolution (alternator revolution ωg). Specifically, at the time of determining the amount of the driving power to be received from the engine, the most efficient operating point for the output of the generator 4 is determined (because the generator [alternator] 4 exhibits different performance characteristic depending upon the revolution) so as to satisfy the following condition. In a case of the rollback state, the output of the generator 4 is determined such that the electric motor loss is greater than the electric-motor output using the following method. With the effective current applied to the electric motor as I, and with the coil resistance as R, the electric motor loss is represented by Expression $((I^2) \times R \times 3)$. On the other hand, with the electric-motor rotational speed as ωm, and with the electric motor torque as Tm, the electric-motor output is represented by Expression (ωm× Tm). Here, the electric-motor effective current I is represented by the following Expression (1) using the d-axis current Id and q-axis current Iq.

$$I = (\sqrt{(Id^2 + Iq^2)})/\sqrt{3} \tag{1}$$

Now, description will be made regarding the energy state in the rollback state. In a case that the output of the electric motor exceeds the electric motor loss, the difference in the electrical energy therebetween represents the regenerative energy. An ordinary hybrid system can use such energy in the regenerative mode. The system according to the present embodiment has no battery, and accordingly, such a system has only a limited capacity for absorbing the electrical energy. With such an arrangement, the system is preferably controlled such that neither an excess nor a shortage of electrical power occurs, i.e., the electric motor loss matches the output of the electric motor. However, it is extremely difficult to control the system such that the electric motor loss completely matches the output of the electric motor, due to the external factors such as the engine revolution. Accordingly, with the present embodiment, at the time of determining the q-axis current instruction value Iq* according to the torque instruction, the output of the electric motor 4 (which enables the electric motor to consume excess electrical power in the form of electric motor loss) is determined such that the electric motor loss $((I^2) \times R \times 3)$ is greater than the electric-motor output (|ωm×Tm|). Furthermore, the d-axis current instruction value Id* is determined based upon the calculation results. With the present embodiment, the Id and Iq are prepared for each rollback operating point with respect to the corresponding engine revolution, in the form of a table. The d-axis current instruction id*, q-axis current instruction Iq*, and field-current instruction Imf*, are calculated based upon the table thus prepared. Note that the field-current instruction Imf* is determined giving consideration to the driving performance of the vehicle and the motor efficiency. Specifically, the output Pg of the generator 4 is represented by the following Expression (2). Furthermore, the output Pg is determined so as to be greater than zero. The Id*, Iq*, and Imf* are determined beforehand based upon the electrical power received from the generator (e.g., 250 W) so as to satisfy the aforementioned condition.

$$((I^2) \times R \times 3) - |\omega m \times Tm| \tag{2}$$

As a result, the excess electrical energy corresponding to the output Pg of the generator 4 is consumed in the form of thermal energy emitted from the AC electric motor 6. The aforementioned Id table and Iq table are created such that the excess electrical energy is applied to the AC electric motor 6 in the form of ineffective current applied to the AC electric motor 6. Specifically, the current applied to the magnetic-flux direction of the AC electric motor 6 serves as the ineffective current. Upon determination of the excess energy, the flow proceeds to Step s108. In Step s108, the voltage instruction computation unit 20 performs control processing for the electric motor and the generator based upon the current instruction values thus determined.

In FIG. 3, the voltage instruction computation unit 20 calculates the d-axis current instruction Vd* and q-axis voltage instruction Vq* based upon the d-axis current instruction Id* and q-axis current instruction Iq* calculated by the current instruction computation unit 19. The three-phase voltage instruction computation unit 21 calculates the AC voltage instructions Vu*, Vv*, and Vw, for the AC electric motor 6 based upon the d-axis voltage instruction Vd* and q-axis voltage instruction Vq* calculated by the voltage instruction computation unit 20, using the magnetic pole position θ detected by a pole-position sensor included in the AC electric motor 6. The PWM/rectangular-wave-signal processing unit 22 creates a driving signal for the switching devices included in the inverter based upon the AC voltage instructions Vu*, Vv*, and Vw*, output from the three-phase instruction computation unit 21. The PWM/rectangular-wave-signal processing unit 22 outputs the driving signal thus created, to the inverter 8 for performing PWM control or rectangular wave control of the inverter 8.

The capacitor voltage instruction computation unit 51 is a component for calculating the voltage instruction value for the capacitor 31. The capacitor voltage instruction computation unit 51 comprises a DC voltage Vdc1 computation unit 23 and a capacitor voltage instruction value Vdc* computation unit 24.

The DC voltage Vdc1 computation unit 23 calculates the output voltage of the generator 4, i.e., the voltage Vdc between both terminals of the capacitor, based upon the d-axis voltage instruction Vd* and the q-axis voltage instruction Vq* calculated by the voltage instruction computation unit 20. First, the phase voltage V applied to the AC electric motor 6 is calculated using the following Expression (3).

$$V = (\sqrt{(Vd^{*2} + Vq^{*2})})/\sqrt{3} \tag{3}$$

Furthermore, in a case of PWM control, the DC voltage Vdc1 computation unit 23 calculates the DC voltage instruction value Vdc1 based upon the phase voltage V applied to the AC electric motor 6 using the following Expression (4).

$$Vdc1 = (2\sqrt{2}) \cdot V \tag{4}$$

On the other hand, in a case of the rectangular wave control, the DC voltage Vdc1 computation unit 23 calculates the DC voltage instruction value Vdc1 using the following Expression (5).

$$Vdc1 = ((2\sqrt{2}) \cdot V)/1.27 \tag{5}$$

Next, description will be made regarding the operation of the capacitor voltage instruction value Vdc* computation unit 24 included in the electric motor control system according to the present embodiment with reference to FIG. 6.

Figure 6:
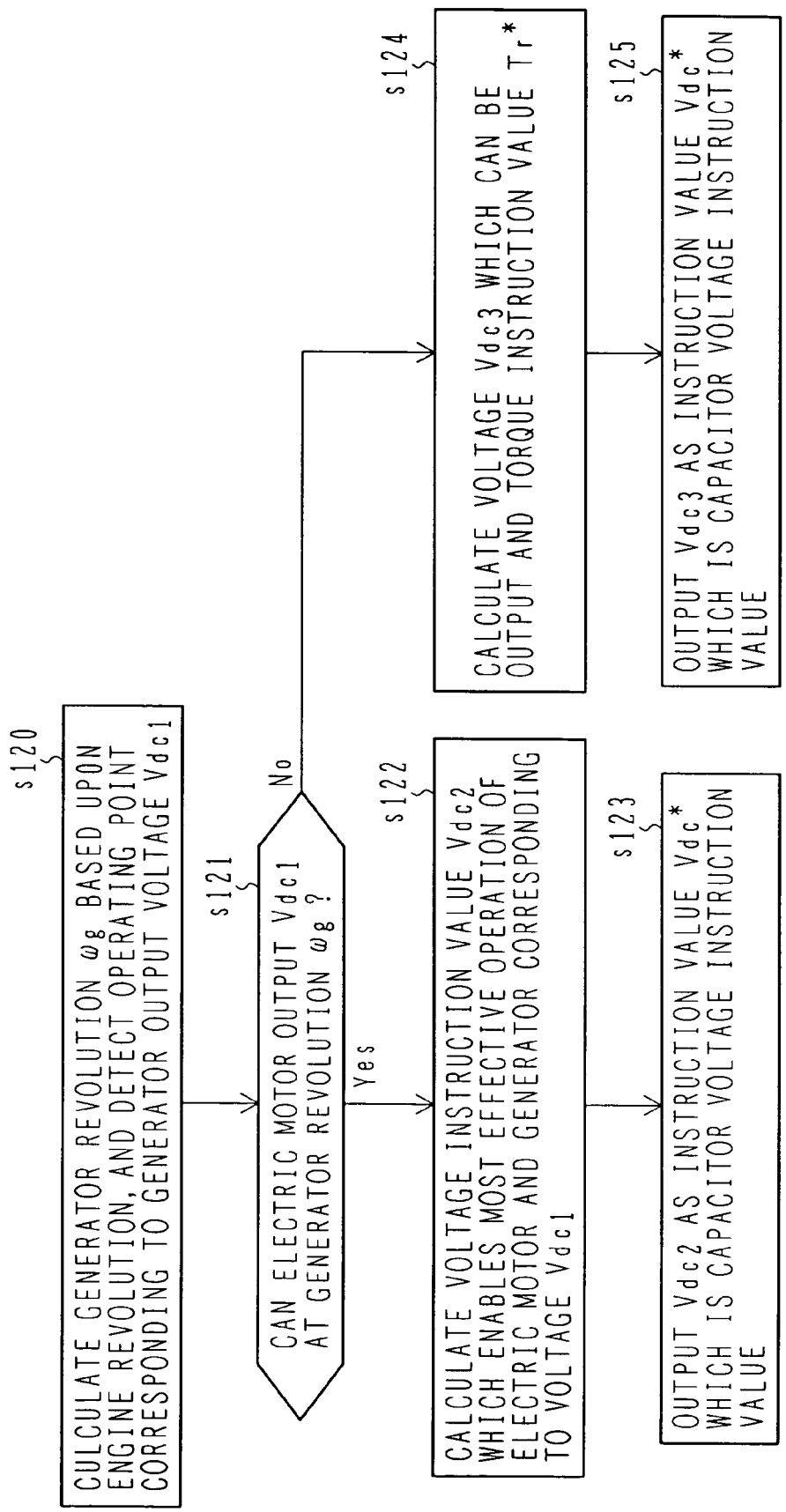
FIG. 6 is a flowchart which shows the operation of the capacitor voltage instruction value Vdc* computation unit included in an electric motor control system according to an embodiment of the present invention.

FIG. 6 is a flowchart which shows the operation of the capacitor voltage instruction value Vdc* computation unit included in the electric motor control system according to an embodiment of the present invention.

In Step s120, the capacitor voltage instruction value Vdc* computation unit 24 extracts the operating point where the generator 4 generates the output voltage Vdc1 at the revolution ωg of the engine 3. With the present embodiment, a reduction mechanism is provided between the engine 3 and the generator 4. With such an arrangement, the engine revolution ωg of 600 rpm is converted into the generator revolution ωg' of 1500 rpm at a reduction ratio of 2.5, for example.

Now, description will be made regarding the characteristics of the generator 4 (at the revolution ωg') with reference to FIG. 7.

Figure 7:
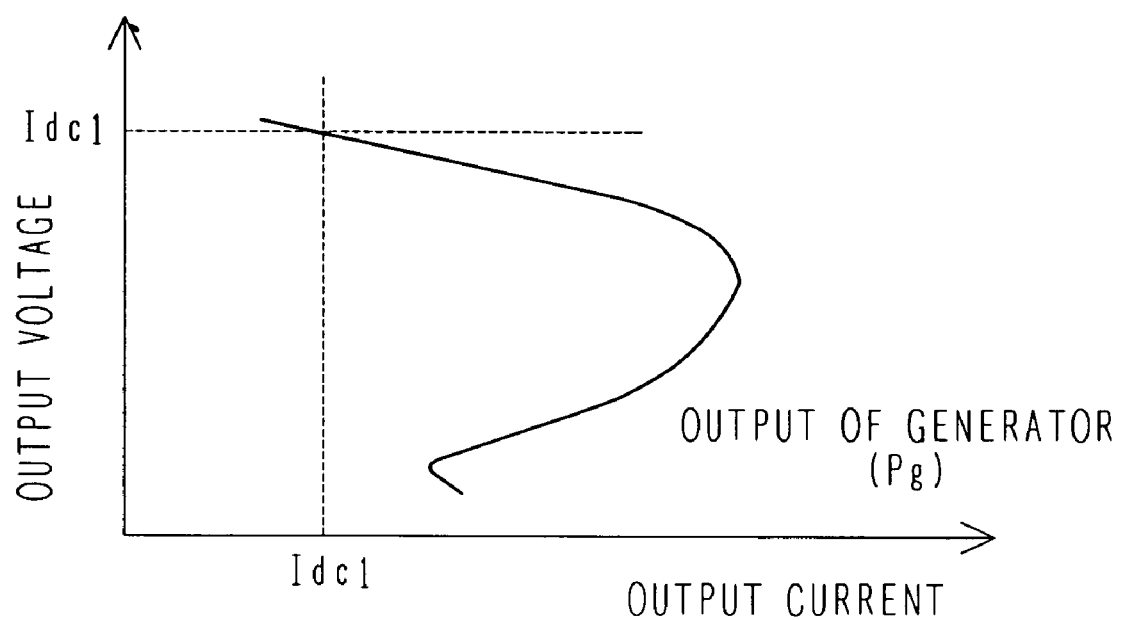
FIG. 7 is an explanatory diagram for describing the characteristics of a generator.

FIG. 7 is an explanatory diagram for describing the characteristic of the generator.

Let us say that the generator 4 has the characteristics (at the revolution ωg') as shown in FIG. 7. The capacitor voltage instruction value Vdc* computation unit 24 extracts the operating point where the generator 4 generates the output voltage Vdc1 at the engine revolution ωg (i.e., at the generator revolution ωg'), i.e., the output current Idc1 of the generator 4, using the table as shown in FIG. 7.

Next, in Step s121 shown in FIG. 6, the capacitor voltage instruction value Vdc* computation unit 24 determines whether or not the AC electric motor 6, driven by receiving the output voltage Vdc1 and the output current Idc1 from the generator 4, can satisfy the requested electric motor torque Pm(=electric motor revolution ωm×torque instruction Tr*).

In a case that the operating point of the generator 4 satisfies the requested need for power, the flow proceeds to Step s122. The capacitor voltage instruction value Vdc* computation unit 24 calculates the optimum voltage instruction value Vdc2 based upon the DC voltage instruction value Vdc1, which enables the effective operation of the AC electric motor 6 and the generator 4. Next, in Step s123, the capacitor voltage instruction value Vdc* computation unit 24 outputs the voltage instruction value Vdc2 to the generator control unit 17 shown in FIG. 2, as the voltage instruction value Vdc*.

On the other hand, let us consider a case in which determination has been made that the operating point of the generator 4 does not satisfy the requested need for power, in Step s121. In this case, in Step s124, the capacitor voltage instruction value Vdc* computation unit 24 calculates the voltage instruction value Vdc3 and the torque instruction value Tr* so as to output the requested power. Next, in Step s125, the capacitor voltage instruction value Vdc* computation unit 24 outputs the voltage instruction value Vdc3 to the generator control unit 17 shown in FIG. 2, as the voltage instruction value Vdc*.

Next, description will be made regarding the generator control method for the generator 4, employed in the electric motor control system according to the present embodiment with reference to FIGS. 8 and 9. Here, description will be made regarding a control method in which the DC bus voltage is used as a feedback signal, as an example.

Figure 8:
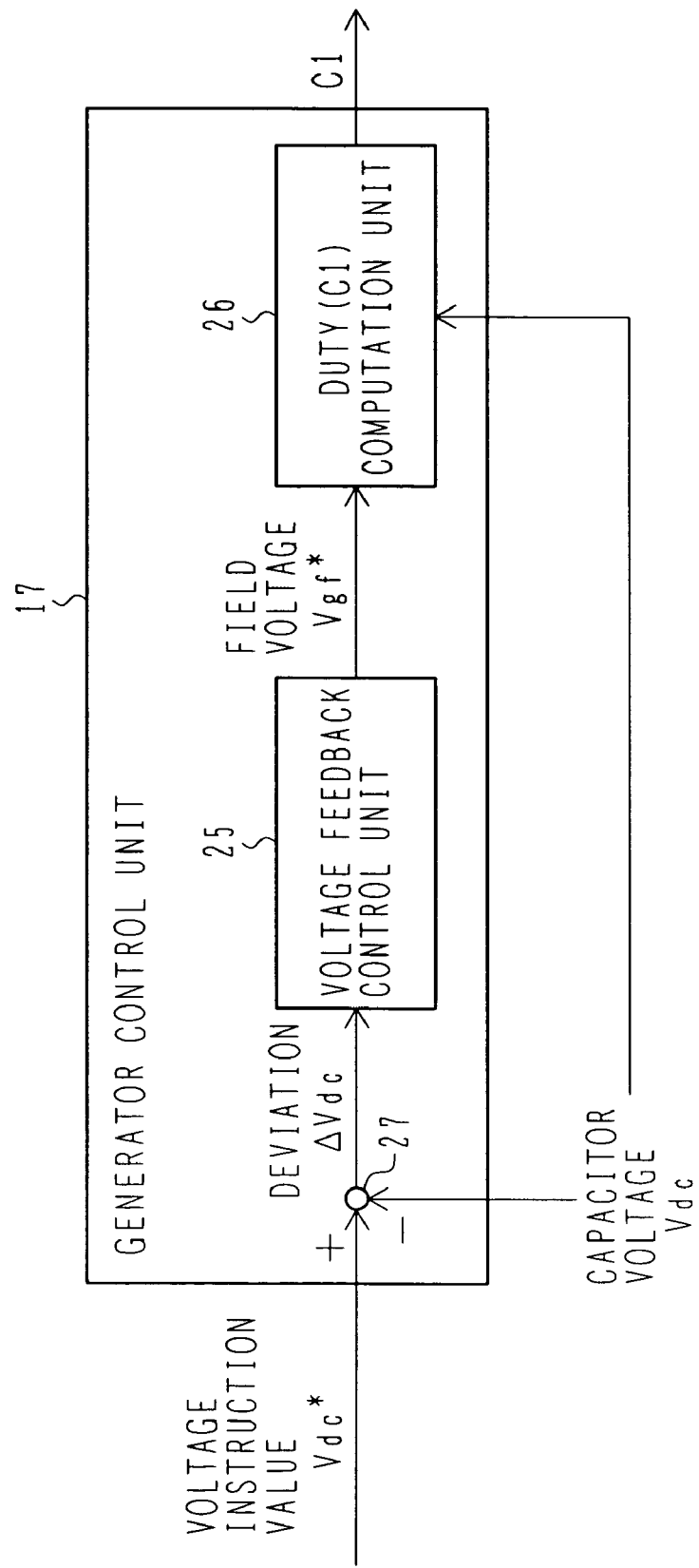
FIG. 8 is a block diagram which shows the configuration of a generator control unit included in an electric motor control system according to an embodiment of the present invention.

FIG. 8 is a block diagram which shows the configuration of the generator control unit 17 included in the electric motor control system according to an embodiment of the present invention. FIG. 9 is a flowchart which shows the operation of the generator control unit included in the electric motor control system according to an embodiment of the present invention.

As shown in FIG. 8, the generator control unit 17 includes subtraction means 27, a voltage feedback control unit 25, and a Duty (C1) computation unit 26.

Figure 9:
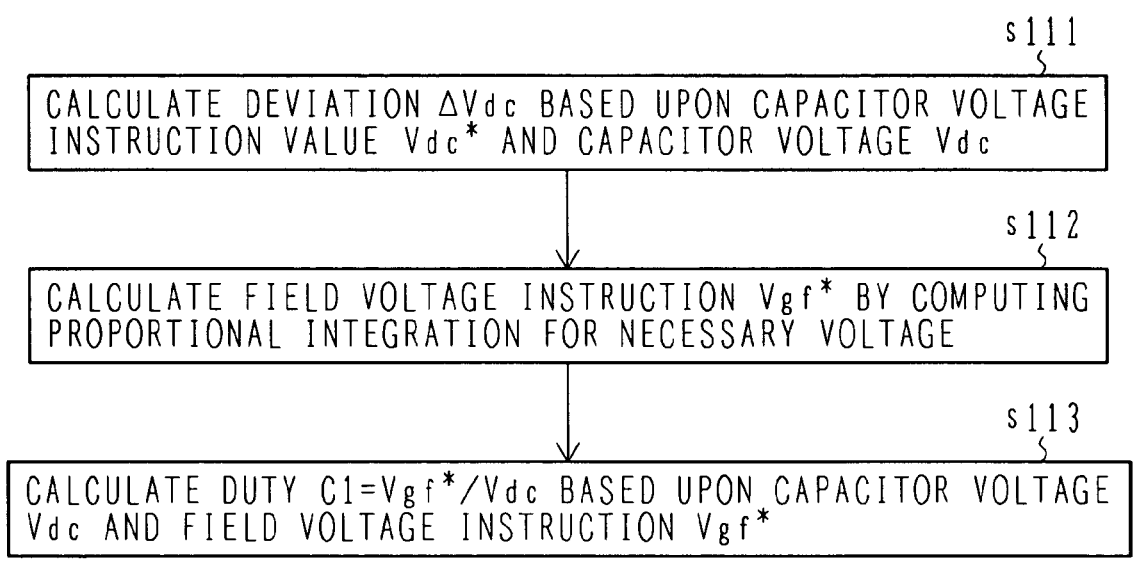
FIG. 9 is a flowchart which shows the operation of a generator control unit included in an electric motor control system according to an embodiment of the present invention.

In Step s122 shown in FIG. 9, the subtraction means 27 calculate the deviation ΔVdc between the capacitor voltage instruction value Vdc* output from the electric motor control unit 16 and the capacitor voltage Vdc which is the voltage applied to both electrodes of the capacitor.

Next, in Step s112, the voltage feedback control unit 25 performs proportional integration (PI) for the deviation ΔVdc obtained in Step s111, and outputs the field-voltage instruction Vgf*. While description has been made regarding an arrangement employing the PI control, the present invention is not restricted to such an arrangement. Let us consider a case in which such an arrangement employing the feedback control system alone has poor response performance. In order to solve the aforementioned problem, an arrangement may be made employing feedforward compensation, in addition to the feedback control.

Next, in Step s113, the Duty (C1) computation unit 26 calculates Vgf*/Vdc as the duty C1(Vgf*) based upon the field-voltage instruction Vgf* output from the voltage feedback control unit 25. The duty C1(Vgf*) signal thus calculated by the Duty (C1) computation unit 26 is supplied to the field coil of the generator 4 so as to perform feedback control such that the capacitor voltage Vdc applied to both terminals of the capacitor 31 matches the capacitor voltage instruction value Vdc*.

As described above, the present embodiment provides stable control of the capacitor voltage Vdc according to the voltage instruction Vdc*. This enables power control for the mutually supportive operation in a cooperative manner between the cooperative operation of the generator 4, the electric motor, and the inverter. Here, the voltage instruction Vdc* is determined based upon the operating point (electric motor revolution, electric motor torque) of the AC electric motor 6.

Next, description will be made regarding the control operation of the electric four-wheel drive vehicle 1 employing the electric motor control system according to the present embodiment with reference to FIG. 10. Here, description will be made regarding the control operation in the rollback state.

Figure 10A:
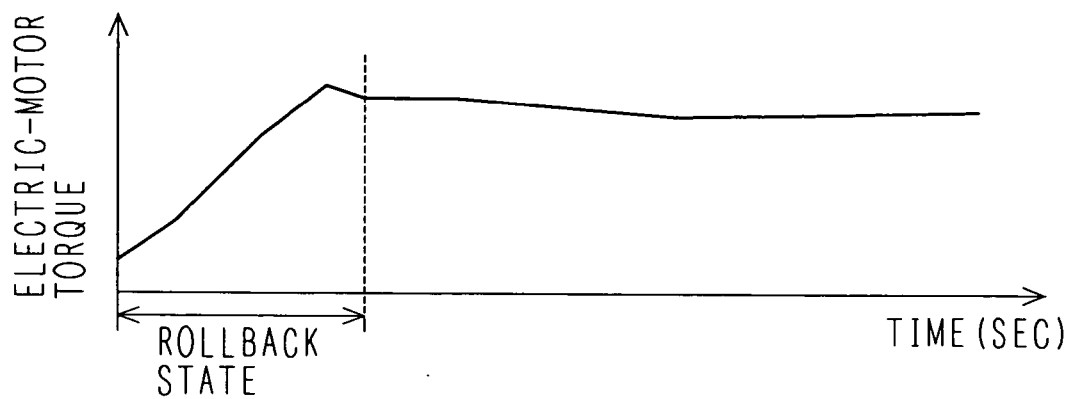
FIGS. 10A through 10C are timing charts which show the control operation of an electric four-wheel drive vehicle employing an electric motor control system according to an embodiment of the present invention.
Figure 10B:
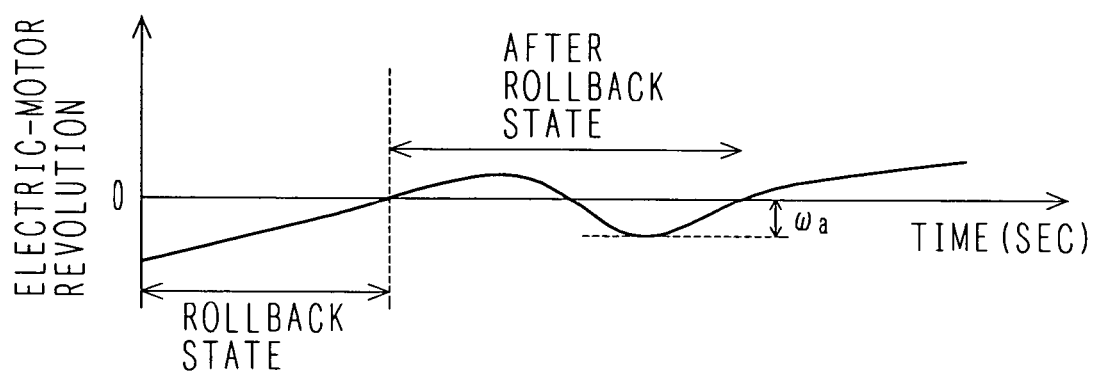
Figure 10C:
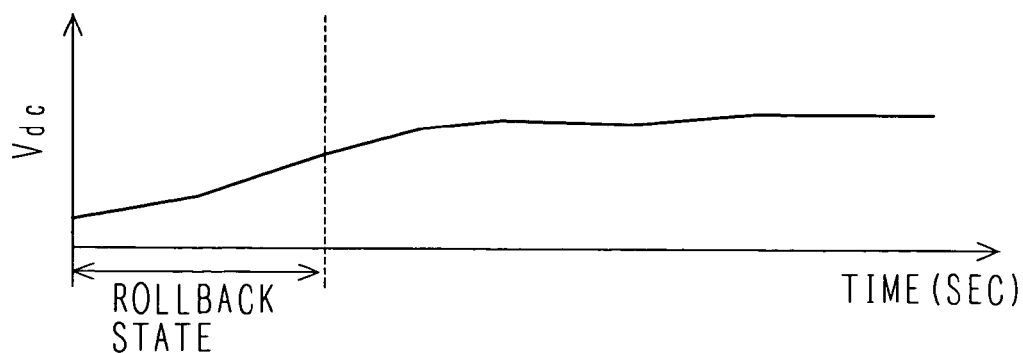

FIGS. 10A through 10C are timing charts which show the control operation for the electric four-wheel drive vehicle 1 employing the electric motor control system according to an embodiment of the present invention. FIG. 10A shows the electric motor torque Tm. FIG. 10B shows the electric-motor rotational speed ωm. FIG. 10C shows the capacitor voltage Vdc. In each drawing, the horizontal axis represents time (sec).

As shown in FIGS. 10A and 10B, in the rollback state, while the electric motor torque is a positive value, the electric-motor rotational speed is a negative value. As described above, the output of the generator 4 is determined such that the electric motor loss (($I^2$)×R×3) is greater than the electric-motor output (|ωm×Tm|). With such an arrangement, the usual perspective would be that the excess energy supplied to the electric motor in the rollback state should be set to a necessary minimum value in order to reduce the energy loss as much as possible. However, with the present embodiment, the excess energy supplied to the electric motor in the rollback state is set to a value somewhat greater than the necessary minimum value. The reason is as follows. Let us consider a case in which the generator 4 outputs the necessary minimum electrical power in the rollback state. In this case, the generator 4 cannot supply sufficient electrical power for the output of the requested torque in the normal mode immediately after the rollback state. In contrast to such an arrangement, with the present embodiment, the generator 4 outputs electrical power somewhat greater than the necessary minimum electrical power in the rollback state for handling such a situation. This enables the system according to the present embodiment to output the necessary torque in the normal mode immediately after the recovery from the rollback state. The electrical power thus determined is input to the AC electric motor 6, and is consumed in the form of electrical power loss. This enables the capacitor voltage Vdc to be stably controlled throughout a period of time from the rollback state up to the normal operation mode after the recovery from the rollback state as shown in FIG. 10C.

As shown in FIG. 10B, upon the recovery from the rollback state, the rotational speed of the electric motor changes from a negative value to a positive value, i.e., the vehicle is driven in the power running mode which is a normal driving mode. However, in some cases, the rotational speed of the electric motor temporarily changes from a positive value to a negative value in a pulsed manner, as shown in FIG. 10B. In order to solve this problem, with the present embodiment, in a case that the rotational speed of the electric motor changes from a positive value to a negative value after the recovery from the rollback state to the power running mode, determination is made whether this change in the rotational speed of the electric motor has occurred in a pulsed manner, or due to the rollback state. In a case that the negative rotational speed of the electric motor ωa has been detected as shown in FIG. 10B, the absolute value of ωa thus detected is compared with a threshold ωaX. In a case that |ωa|<ωaX, the rollback determination unit 18 does not make a determination that the vehicle is in the rollback state. The threshold ωaX is set to 50 [rpm], for example. With such an arrangement, in Step s103 shown in FIG. 4, in a case that the rotational speed of the electric motor satisfies the condition of |ωa|<ωaX as described above, the flow proceeds to Step s104.

As described above, the present embodiment enables an electric four-wheel drive vehicle having no battery to output the requested torque while absorbing the regenerative electrical power which is excess electrical energy. This allows such an electric four-wheel drive vehicle to output the requested torque while preventing damage to the capacitor 31 and the power devices included in the inverter 8 due to the regenerative electrical power. Also, the present embodiment may be applied to an arrangement employing a field-coil synchronous electric motor as the AC electric motor. This enables effective torque control and power generation control by adjustment of the field current. Note that the control method according to the present embodiment can be effectively performed at the time of shift change, or in order to escape from the mud.

Next, description will be made regarding the configuration and operation of an arrangement in which an electric motor control system according to another embodiment of the present invention is applied to a hybrid vehicle having a simple configuration employing an AC electric motor and an AC generator with reference to FIG. 11.

Figure 11:
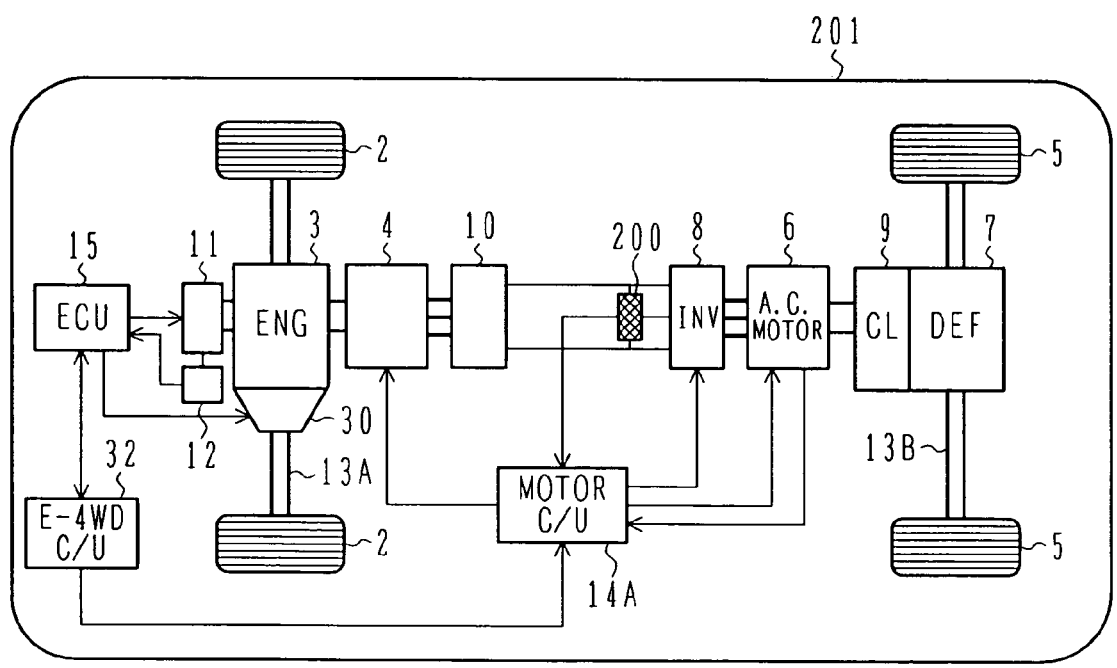
FIG. 11 is a system block diagram which shows an overall configuration of an arrangement in which an electric motor control system according to an embodiment of the present invention is applied to a hybrid vehicle having a simple configuration employing an AC electric motor and an AC generator.

FIG. 11 is a system block diagram which shows an overall configuration of an arrangement in which an electric motor control system according to an embodiment of the present invention is applied to a hybrid vehicle having a simple configuration employing an AC electric motor and an AC generator (alternator). Note that the same components as those shown in FIG. 1 are denoted by the same reference numerals.

The electric four-wheel drive vehicle shown in FIG. 1 has no battery, and the small electrical power stored in the capacitor 31 included in the inverter 8 needs to be controlled. On the other hand, with the present embodiment, a hybrid vehicle includes a battery 200 as shown in FIG. 11. With such an arrangement, the electrical power generated by the generator 4 can be stored in the battery 200. Specifically, the battery 200 temporarily stores the electrical power generated by the generator 4, and accumulates the regenerative electrical power. In a case that the vehicle is in the rollback state as described above, the regenerative electrical power is accumulated in the battery 200.

With the present embodiment, an electric motor controller 14A monitors the charge state of the battery 200. In a case that determination has been made that the battery 200 cannot absorb the regenerative energy generated by the AC electric motor 6, the electric motor controller 14A effects control so as to suppress the regenerative electrical power. That is to say, in a case that it is difficult to absorb the regenerative electrical power as described above, the excess regenerative energy should be consumed by they AC electric motor. Accordingly, basic control is performed such that the electric-motor output matches the electric motor loss, i.e., Pg=0 as introduced from Expression (2). Let us consider a situation in which the battery 200 cannot store regenerative electrical power, in the same way as the electric four-wheel drive vehicle 1 shown in FIG. 1. In this situation, with the present embodiment, the output of the generator (which enables the electric motor to consume excess electrical power in the form of electric motor loss) is determined such that the electric motor loss is greater than the output of the electric-motor, giving consideration to the engine revolution ωg. This enables the AC electric motor 6 to consume the excess electrical energy, which cannot be absorbed by the battery 200, in the form of thermal energy. As described above, the present embodiment can be applied to a hybrid vehicle having a configuration employing an AC generator as the generator. Such an arrangement has the advantage of effectively consuming excess regenerative energy.

Next, description will be made regarding to the configuration and operation of an arrangement in which an electric motor control system according to yet another embodiment of the present invention is applied to a hybrid vehicle employing a motor generator 4B as the generator, with reference to FIG. 12.

Figure 12:
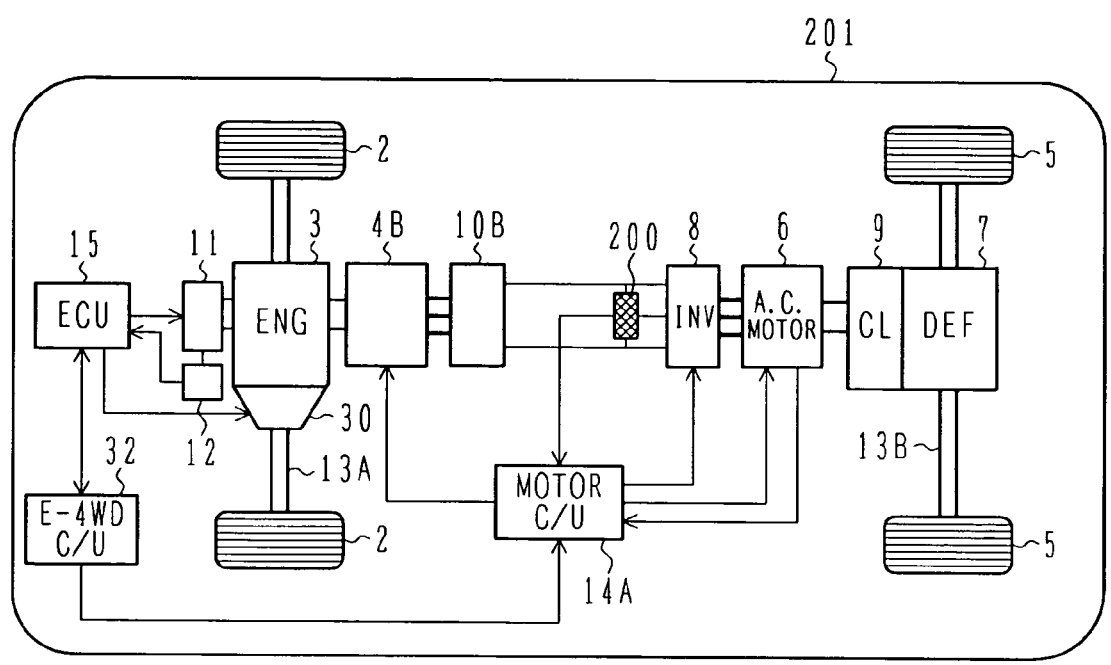
FIG. 12 is a system block diagram which shows an overall configuration of an arrangement in which an electric motor control system according to an embodiment of the present invention is applied to a hybrid vehicle employing an AC electric motor and a motor generator.

FIG. 12 is a system block diagram which shows an overall configuration of an arrangement in which an electric motor control system according to yet another embodiment of the present invention is applied to a hybrid vehicle employing the motor generator 4B as the generator. Note that the same components as those shown in FIG. 1 are denoted by the same reference numerals.

Unlike an alternator, the motor generator 4B has both the generating function and driving function. Accordingly, an electric-power converter 10B such as an inverter is provided. Note that the same components as those shown in FIG. 1 are denoted by the same reference numerals. With the hybrid vehicle having such a configuration, the regenerative electrical power is accumulated in the battery 200 in the rollback state of the vehicle in the same way as described above. With such an arrangement, the electric motor controller 14A monitors the charge state of the battery 200. In a case that determination has been made that the battery 200 cannot absorb the regenerative energy generated by the AC electric motor 6, the system is controlled so as to suppress regenerative electrical power. That is to say, in a case that it is difficult for the battery 200 to absorb the regenerative electrical power, the excess regenerative energy should be consumed by the AC electric motor. Accordingly, with such an arrangement, basic control is performed such that the output of the electric motor matches the electric motor loss, i.e., Pg=0 as introduced from Expression (2), as described above.

Let us consider a case in which the battery 200 has a certain degree of available capacity, unlike a situation in which the battery 200 is fully charged or almost fully charged. An arrangement may be made in which determination is made that the battery 200 has been fully charged from such a battery-charge state, depending upon other factors which cause a large amount of current in an extremely short period of time. For example, let us consider a situation in which the vehicle takes off uphill on a slippery slope, or a case of escaping from deep snow or mud. In such cases, the driver presses the accelerator pedal with considerable force. This increases the engine revolution and the torque instruction. In such cases, the generator generates an excess of energy as the regenerative electrical power. In some cases, determination can be made that the quantity of such electrical power is too large to be stored in the battery 200 since the generator generates a considerably large amount of regenerative electrical power. Accordingly, an arrangement may be made in which a part of the regenerative electrical power is accumulated in the battery 200, and the remaining part is consumed by the AC electric motor 6 in the form of thermal energy. Such an arrangement enables effective control of the charging/discharging of the battery 200.

What is claimed is:

1. A control system for an electric driving system, used in an electric driving system for a vehicle, wherein said electric driving system for a vehicle comprises:

an in-vehicle power supply for supplying DC electrical power;

an inverter for converting said DC electrical power output from said in-vehicle power supply, into AC electrical power; and an AC electric motor, which is driven by the AC electrical power output from said inverter, for generating electrical driving force for driving a component to be driven, wherein said control system for an electric driving system provides control means for controlling driving of said AC electric motor by controlling said inverter according to an instructed torque for said AC electric motor, and wherein, in a case that the output of said AC electric motor becomes negative, and excess electrical energy is generated, said control means controls the current applied to said AC electric motor such that the loss in said AC electric motor exceeds the negative output of said AC electric motor.

2. A control system for an electric driving system according to claim 1, wherein, in a case that the output of said AC electric motor becomes negative, and excess electrical energy is generated, said control means control the current applied to said AC electric motor so as to increase ineffective current in said AC electric motor.

3. A control system for an electric driving system according to claim 2, wherein the ineffective current in said AC electric motor, which is absorbed in the form of loss in said AC electric motor, is determined based upon the excess electrical power output to said inverter from said in-vehicle power supply.

4. A control system for an electric driving system, used in an electric driving system for a multi-wheel drive vehicle, wherein said electric driving system for a multi-wheel drive vehicle comprises:

a generator for outputting DC electrical power by the driving force received from an internal combustion engine for driving at least one of a plurality of wheels;

an inverter for converting said DC electrical power directly received from said generator, into AC electrical power; and an AC electric motor, which is driven by the AC electrical power output from said inverter, for driving at least one of said plurality of wheels other than said wheels driven by said internal combustion engine, wherein said control system for an electric driving system privides control means for controlling driving of said AC electric motor by controlling said inverter according to an instructed torque received from a vehicle for said AC electric motor, and wherein, in a case that the output of said AC electric motor becomes negative, and excess electrical energy is generated, said control means control the current applied to said AC electric motor such that the loss in said AC electric motor exceeds the negative output of said AC electric motor.

5. A control system for an electric driving system according to claim 4, wherein, in a case that the output of said AC electric motor becomes negative, and excess electrical energy is generated, said control means control the current applied to said AC electric motor so as to increase ineffective current in said AC electric motor.

6. A control system for an electric driving system according to claim 5, wherein the ineffective current in said AC electric motor, which is absorbed in the form of loss in said AC electric motor, is determined based upon the excess electrical power output to said inverter from said generator.

7. A control system for an electric driving system, used in an electric driving system for an electric vehicle, wherein said electric driving system for an electric vehicle comprises:

a capacitor which enables charging/discharging using DC electrical power;

an inverter for converting said DC electrical power received by discharging said capacitor, into AC electrical power; and an AC electric motor, which is driven by the AC electrical power output from said inverter, for generating electrical driving force for driving said vehicle, wherein said control system for an electric driving system provides control means for controlling driving of said AC electric motor by controlling said inverter according to an instructed torque received from a vehicle for said AC electric motor, and wherein, in a case that the output of said AC electric motor becomes negative, and excess electrical energy is generated, said control means control the current applied to said AC electric motor such that the loss in said AC electric motor exceeds the negative output of said AC electric motor.

8. A control system for an electric driving system according to claim 7, wherein, in a case that the output of said AC electric motor becomes negative, and excess electrical energy is generated, said control means control the current applied to said AC electric motor so as to increase ineffective current in said AC electric motor.

9. A control system for an electric driving system according to claim 8, wherein the ineffective current in said AC electric motor, which is absorbed in the form of loss in said AC electric motor, is determined based upon the excess electrical power output to said inverter from said capacitor.

10. An electric driving system for a vehicle, for generating electrical driving force for driving a component of the vehicle to be driven, comprising:
an in-vehicle power supply for supplying DC electrical power;
an inverter for converting said DC electrical power, output from said in-vehicle power supply, into AC electrical power;
an AC electric motor, which is driven by the AC electrical power output from said inverter, for generating electrical driving force; and
a control unit for controlling driving of said AC electric motor by controlling said inverter according to an instructed torque for said AC electric motor,
wherein, in a case that the output of said AC electric motor becomes negative, and excess electrical energy is generated, said control unit controls the current applied to said AC electric motor such that the loss in said AC electric motor exceeds the negative output of said AC electric motor,
and wherein the excess electrical power is supplied to said inverter from said in-vehicle power supply in the form of loss in said AC electric motor.

11. An electric driving system for an electric driving system according to claim 10, wherein, in a case that the output of said AC electric motor becomes negative, and excess electrical energy is generated, said control means control the current applied to said AC electric motor so as to increase ineffective current in said AC electric motor.

12. An electric driving system for an electric driving system according to claim 11, wherein the ineffective current in said AC electric motor is determined based upon the excess electrical power.

13. An electric driving system for a multi-wheel drive vehicle having a function of driving at least one of a plurality of wheels by an internal combustion engine, and a function of driving at least one of said plurality of wheels other than said wheels driven by said internal combustion engine, by electrical driving force, said electric driving system comprising:
a generator for outputting DC electrical power by the driving force received from said internal combustion engine;
an inverter for converting said DC electrical power directly received from said generator, into AC electrical power;
an AC electric motor, which is driven by the AC electrical power output from said inverter, for driving at least one of said plurality of wheels other than said wheels driven by said internal combustion engine; and
a control device including control means for controlling driving of said AC electric motor by controlling said inverter according to an instructed torque received from a vehicle for said AC electric motor,
wherein, in a case that the output of said AC electric motor becomes negative, and excess electrical energy is generated, said control means control the current applied to said AC electric motor such that the loss in said AC electric motor exceeds the negative output of said AC electric motor,
and wherein the excess electrical power is supplied to said inverter from said generator in the form of loss in said AC electric motor.

14. An electric driving system for an electric driving system according to claim 13, wherein, in a case that the output of said AC electric motor becomes negative, and excess electrical energy is generated, said control means control the current applied to said AC electric motor so as to increase ineffective current in said AC electric motor.

15. An electric driving system for an electric driving system according to claim 14, wherein the ineffective current in said AC electric motor is determined based upon the excess electrical power.

16. An electric driving system for driving a vehicle by electrical driving force comprising:
a capacitor which enables charging/discharging using DC electrical power;
an inverter for converting said DC electrical power received by discharging said capacitor, into AC electrical power;
an AC electric motor, which is driven by the AC electrical power output from said inverter, for generating said electrical driving force; and
a control device including control means for controlling driving of said AC electric motor by controlling said inverter according to an instructed torque received from a vehicle for said AC electric motor,
wherein, in a case that the output of said AC electric motor becomes negative, and excess electrical energy is generated, said control means control the current applied to said AC electric motor such that the loss in said AC electric motor exceeds the negative output of said AC electric motor,
and wherein the excess electrical power is supplied to said inverter from said capacitor in the form of loss in said AC electric motor.

17. An electric driving system for an electric driving system according to claim 16, wherein, in a case that the output of said AC electric motor becomes negative, and excess electrical energy is generated, said control means control the current applied to said AC electric motor so as to increase ineffective current in said AC electric motor.

18. An electric driving system for an electric driving system according to claim 17, wherein the ineffective current in said AC electric motor is determined based upon the excess electrical power.

19. A multi-wheel drive vehicle comprising:
an internal combustion engine for driving at least one of a plurality of wheels;
a generator, which is driven by said internal combustion engine, for outputting DC electrical power;
an inverter for converting said DC electrical power, directly received from said generator, into AC electrical power;
an AC electric motor, which is driven by the AC electrical power output from said inverter, for driving at least one of said plurality of wheels other than said wheels driven by said internal combustion engine; and
a control device including control means for controlling driving of said AC electric motor by controlling said inverter according to an instructed torque received from a vehicle for said AC electric motor,
wherein, in a case that the output of said AC electric motor becomes negative, and excess electrical energy is generated, said control means control the current applied to said AC electric motor such that the loss in said AC electric motor exceeds the negative output of said AC electric motor,
and wherein the excess electrical power is supplied to said inverter from said generator in the form of loss in said AC electric motor.

20. A hybrid vehicle comprising:
an internal combustion engine for generating driving force for a vehicle;

an AC electric motor for generating driving force for said vehicle;

a capacitor forming a power supply for said AC electric motor;

an inverter for converting DC electrical power received from said capacitor, into AC electrical power, which is supplied to said AC electric motor for driving said AC electric motor; and a control device including control means for controlling driving of said AC electric motor by controlling said inverter according to an instructed torque received from a vehicle for said AC electric motor, wherein, in a case that the output of said AC electric motor becomes negative, and excess electrical energy is generated, said control means control the current applied to said AC electric motor such that the loss in said AC electric motor exceeds the negative output of said AC electric motor, and wherein the excess electrical power is supplied to said inverter from said capacitor in the form of loss in said AC electric motor.

* * * * *